US009756505B1

(12) United States Patent
Jiang et al.

(10) Patent No.: US 9,756,505 B1
(45) Date of Patent: Sep. 5, 2017

(54) SYSTEMS AND METHODS FOR UTILIZING AUTHENTICATION REQUESTS FOR ON-DEMAND PROVISIONING OF ACCESS-POINT ACCOUNTS

(71) Applicant: Symantec Corporation, Mountain View, CA (US)

(72) Inventors: Kevin Jiang, Waltham, MA (US); Michael Shavell, Merrimack, NH (US)

(73) Assignee: Symantec Corporation, Mountain View, CA (US)

( * ) Notice: Subject to any disclaimer, the term of this patent is extended or adjusted under 35 U.S.C. 154(b) by 9 days.

(21) Appl. No.: 14/732,813

(22) Filed: Jun. 8, 2015

(51) Int. Cl.
*H04W 12/08* (2009.01)
*H04L 29/06* (2006.01)
*H04W 12/06* (2009.01)

(52) U.S. Cl.
CPC ............ *H04W 12/08* (2013.01); *H04L 63/08* (2013.01); *H04L 63/083* (2013.01); *H04L 63/10* (2013.01); *H04W 12/06* (2013.01)

(58) Field of Classification Search
CPC ..... H04L 63/0823; H04L 63/20; G06F 21/53; G06F 21/6218; G06F 21/32; H04W 12/04
USPC ........................................................... 726/5
See application file for complete search history.

(56) References Cited

U.S. PATENT DOCUMENTS

| 7,535,880 | B1* | 5/2009 | Hinman | H04W 12/08 370/338 |
| 8,776,196 | B1 | 7/2014 | Oliver et al. | |
| 8,806,567 | B1* | 8/2014 | Venable, Sr. | H04L 63/0823 340/8.1 |
| 8,806,593 | B1* | 8/2014 | Raphel | H04L 63/20 726/6 |
| 8,806,599 | B2 | 8/2014 | Roy | |
| 9,554,061 | B1* | 1/2017 | Proctor, Jr. | H04N 5/268 |
| 2003/0196115 | A1* | 10/2003 | Karp | H04L 29/12311 726/5 |

(Continued)

OTHER PUBLICATIONS

Keith Newstadt, et al; Systems and Methods for Collecting Thief-Identifying Information on Stolen Computing Devices; U.S. Appl. No. 14/012,433, filed Aug. 28, 2013.

(Continued)

*Primary Examiner* — Hadi Armouche
*Assistant Examiner* — Bryan Wright
(74) *Attorney, Agent, or Firm* — FisherBroyles LLP

(57) ABSTRACT

The disclosed computer-implemented method for on-demand provisioning of access-point accounts may include receiving, at an access point, a first request from an unknown guest to access a secured network. The guest may not yet have an account with the access point that allows the guest to access the secured network, and the first request may include authentication information that was generated from a credential of the unknown guest that is required by the access point to provision the account for the guest. The computer-implemented method may further include (1) receiving a second request that includes the credential from an administrator of the secured network to provision the account for the guest using the credential, (2) provisioning the account for the guest using the credential, and (3) enabling the guest to access the secured network using the account for the guest. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2008/0250485 A1* | 10/2008 | Schreyer | ................ | G06F 21/32 |
| | | | | 726/9 |
| 2009/0288150 A1* | 11/2009 | Toomim | .............. | G06F 21/6218 |
| | | | | 726/5 |
| 2013/0095789 A1* | 4/2013 | Keevill | ................ | H04W 12/06 |
| | | | | 455/411 |
| 2013/0111554 A1* | 5/2013 | Sposato | ................ | H04L 63/20 |
| | | | | 726/4 |
| 2014/0026192 A1* | 1/2014 | Gatewood | .............. | H04L 63/20 |
| | | | | 726/4 |
| 2015/0089600 A1* | 3/2015 | Fan | ...................... | H04W 12/04 |
| | | | | 726/4 |
| 2015/0350910 A1* | 12/2015 | Eramian | .............. | H04W 12/08 |
| | | | | 726/6 |
| 2016/0212695 A1* | 7/2016 | Lynch | ................... | H04W 48/08 |
| 2017/0019409 A1* | 1/2017 | Shalunov | ............ | H04L 12/6418 |

OTHER PUBLICATIONS

Justin Harmon; Systems and Methods for Detecting Potentially Illegitimate Wireless Access Points; U.S. Appl. No. 14/608,218, filed Jan. 29, 2015.

Justin Harmon; Systems and Methods for Detecting Potentially Illegitimate Wireless Access Points; U.S. Appl. No. 14/625,075, filed Feb. 18, 2015.

\* cited by examiner

SYSTEMS AND METHODS FOR UTILIZING AUTHENTICATION REQUESTS FOR ON-DEMAND PROVISIONING OF ACCESS-POINT ACCOUNTS

BACKGROUND

Most home Wi-Fi networks today use a single pre-shared key (e.g., a password) for authentication and encryption (e.g., WPA-PSK). Using a single pre-shared key may work well when all devices on the network are fully trusted, but in practice this is often not the case. In many home scenarios, it is common for a guest to ask for a Wi-Fi network's password so that the guest can get Internet access on their laptop or mobile device. Unfortunately if a Wi-Fi administrator gives the guest the Wi-Fi password, the guest may gain the capability to capture and decrypt link-layer communication for all device traffic on that Wi-Fi network.

Other related problems may also exist when using a pre-shared key for Wi-Fi network authentication and encryption. For example, a Wi-Fi administrator may need to trust that, once a guest that has been provided with a Wi-Fi network's pre-shared key no longer needs access to the Wi-Fi network, the guest does not give away the pre-shared key by accident or on purpose. Additionally, since a pre-shared key may be used as an authentication mechanism, it may be difficult to set different access controls on the devices connected to a Wi-Fi network if the devices use the same pre-shared key.

Some access-point technologies use WPA-ENTERPRISE in an attempt to resolve many of the above-mentioned issues with using pre-shared keys to secure access to Wi-Fi networks. In general, WPA-ENTERPRISE provides each guest of a Wi-Fi network a separate username and password, which may enable each guest to be individually managed. However, using WPA-ENTERPRISE to secure access to Wi-Fi networks typically requires an administrator to set up and manage an authentication server (e.g., a RADIUS server) for account management, which is generally too complicated for the average home Wi-Fi administrator. Although, some home access points may include an embedded authentication server, an administrator may still be required to log into the access point to create an account for each guest that wishes to connect to the access point. Accordingly, the instant disclosure identifies and addresses a need for additional and improved systems and methods for provisioning access-point accounts.

SUMMARY

As will be described in greater detail below, the instant disclosure describes various systems and methods for on-demand provisioning of access-point accounts. In one example, a computer-implemented method for on-demand provisioning of access-point accounts may include receiving, at an access point, a first request from an unknown guest to access a secured network via the access point. In this example, the unknown guest may not yet have an account with the access point that allows the unknown guest to access the secured network, and the first request may include authentication information (e.g., a hash value) that was generated from a credential (e.g., a password) of the unknown guest that is required by the access point to provision the account for the unknown guest. In some examples, the computer-implemented method may further include (1) receiving a second request, that includes the credential, from an administrator of the secured network to provision the account for the unknown guest using the credential, (2) provisioning, in response to receiving the second request, the account for the unknown guest using the credential received as part of the second request, and (3) enabling the unknown guest to access the secured network using the account for the unknown guest.

In some embodiments, the credential may include a password, and the authentication information may include a hash value that was generated at an accessing device of the unknown guest and transmitted, from the accessing device, as part of the first request. In these embodiments, the computer-implemented method may further include (1) transmitting, to an administering device of the administrator, a third request for the password, (2) receiving, as input at the administering device, the password from the administrator, and (3) transmitting, from the administering device, the password as part of the second request. Moreover in these embodiments, the step of provisioning the account for the unknown guest may include provisioning the account for the unknown guest using the password transmitted from the administering device. In some embodiments, the administering device may include a mobile device of the administrator, and the steps of receiving the password and transmitting the password may be performed by a mobile application installed on the mobile device.

In some embodiments, the first request may include an authentication request of an authentication protocol. In at least one embodiment, the first request may include an authentication request of an extensible authentication protocol.

In some examples, the computer-implemented method may further include (1) refraining from responding to the first request with a failed authentication response and (2) responding to the first request with a successful authentication response after the account for the unknown guest is provisioned.

In at least one embodiment, the second request may include information that indicates that an account policy should be applied to the account for the unknown guest, and the step of provisioning the account for the unknown guest may include applying the account policy to the account for the unknown guest.

In one example, a system for implementing the above-described method may include an authentication module, stored in memory, that receives, at an access point, a first request from an unknown guest to access a secured network via the access point. In this example, the unknown guest may not yet have an account with the access point that allows the unknown guest to access the secured network, and the first request may include authentication information that was generated from a credential of the unknown guest that is required by the access point to provision the account for the unknown guest. In some examples, the system may further include (1) a receiving module, stored in memory, that receives a second request, that includes the credential, from an administrator of the secured network to provision the account for the unknown guest using the credential, (2) a provisioning module, stored in memory, that provisions, in response to the second request, the account for the unknown guest using the credential received as part of the second request, (3) an access-enabling module, stored in memory, that enables the unknown guest to access the secured network using the account for the unknown guest, and (4) at least one processor that executes the authentication module, the receiving module, the provisioning module, and the access-enabling module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to receive, at an access point, a first request from an unknown guest to access a secured network via the access point. In this example, the unknown guest may not yet have an account with the access point that allows the unknown guest to access the secured network, and the first request may include authentication information that was generated from a credential of the unknown guest that is required by the access point to provision the account for the unknown guest. In some examples, the one or more computer-executable instructions may further cause the computing device to (1) receive a second request that includes the credential from an administrator of the secured network to provision the account for the unknown guest using the credential, (2) provision, in response to receiving the second request, the account for the unknown guest using the credential received as part of the second request, and (3) enable the unknown guest to access the secured network using the account for the unknown guest.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
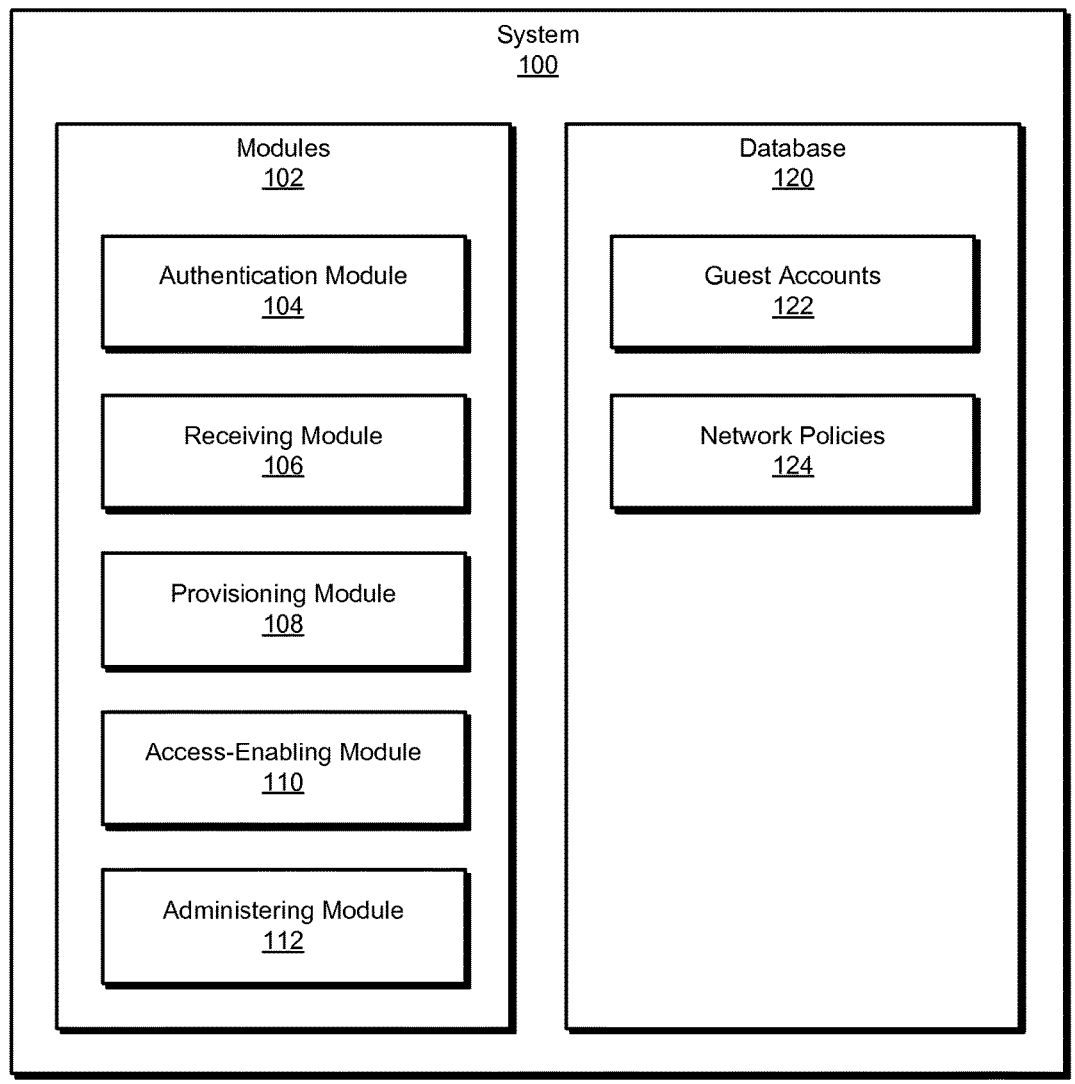
FIG. 1 is a block diagram of an exemplary system for on-demand provisioning of access-point accounts.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for on-demand provisioning of access-point accounts. As will be explained in greater detail below, by treating an unknown guest's initial Wi-Fi connection request that is received at an access point as an account-provisioning request, the systems and methods described herein may simplify the provisioning of an access-point account for the unknown guest. Furthermore, in some examples, by enabling an administrator of an access point that enables access to a secure network to (1) be notified via a mobile device of the administrator when guests wish access to the secured network and (2) provision, via the mobile device, accounts for the guests, these systems and methods may enable the administrator to easily provision guest accounts in a way that does not require the administrator to log into the access point to create an account for each guest that wishes to connect to the access point. Embodiments of the instant disclosure may also provide various other advantages and features, as discussed in greater detail below.

Figure 2:
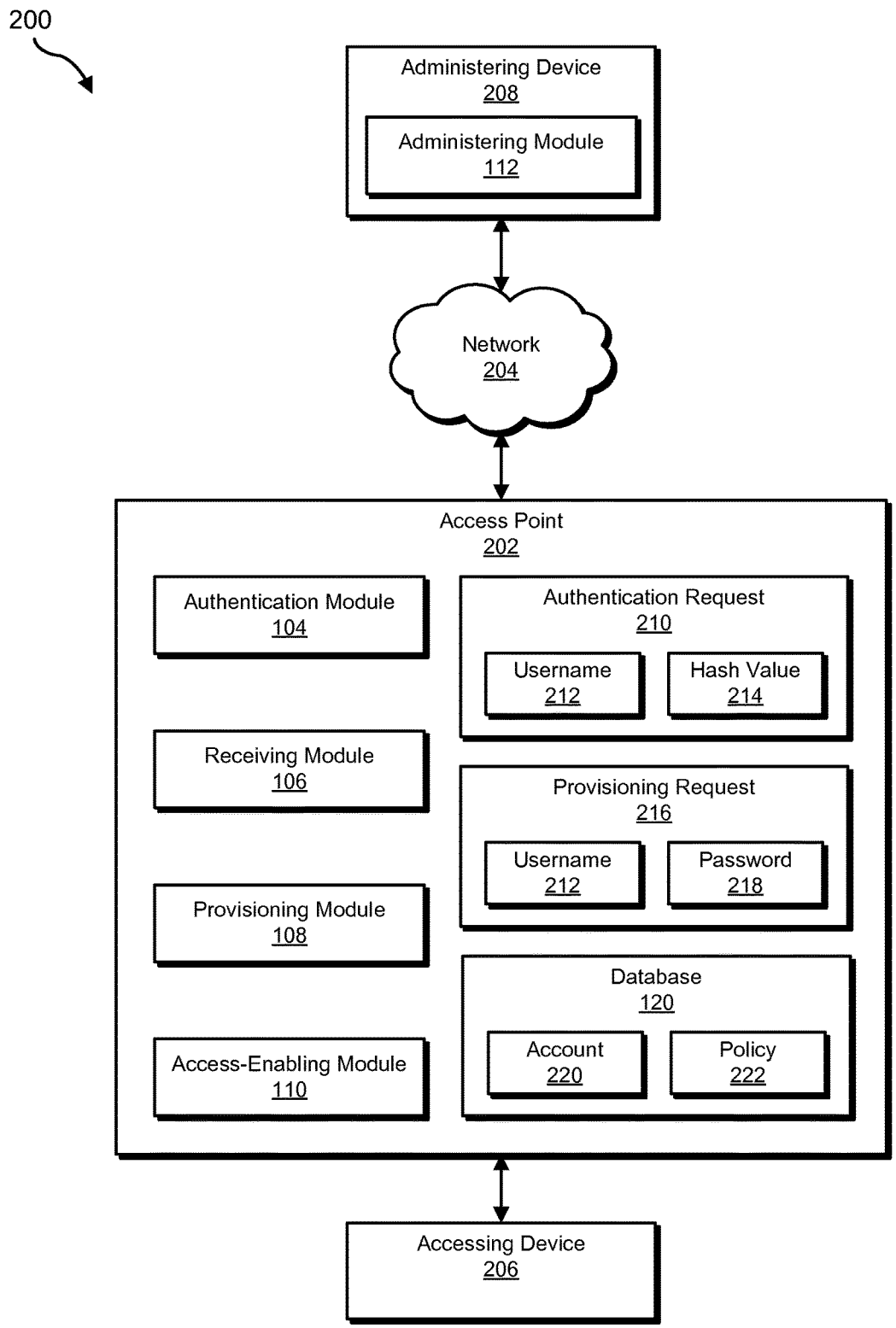
FIG. 2 is a block diagram of an additional exemplary system for on-demand provisioning of access-point accounts.

The following will provide, with reference to FIGS. 1-2, detailed descriptions of exemplary systems for on-demand provisioning of access-point accounts. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for on-demand provisioning of access-point accounts. As illustrated in this figure, exemplary system 100 may include one or more modules 102 for performing one or more tasks. For example, and as will be explained in greater detail below, exemplary system 100 may include an authentication module 104 that receives, at an access point, a first request from an unknown guest to access a secured network via the access point. In this example, the unknown guest may not yet have an account with the access point that allows the unknown guest to access the secured network, and the first request may include authentication information that was generated from at least one credential of the unknown guest that is required by the access point to provision the account for the unknown guest. Exemplary system 100 may further include a receiving module 106 that receives a second request, that includes the credential, from an administrator of the secured network to provision the account for the unknown guest using the credential.

In addition, and as will be described in greater detail below, exemplary system 100 may include a provisioning module 108 that provisions, in response to the second request, the account for the unknown guest using the credential received as part of the second request. Exemplary system 100 may also include an access-enabling module 110 that enables the unknown guest to access the secured network using the account for the unknown guest. In some examples, exemplary system 100 may further include an administering module 112 that (1) receives, as input at an administering device of the administrator, the password from the administrator and (2) transmits, from the administering device, the password as part of the second request. Although illustrated as separate elements, one or more of modules 102 in FIG. 1 may represent portions of a single module or application. In at least one example, one or more of modules 102 in FIG. 1 may represent portions of an embedded authentication server (e.g., an embedded RADIUS server) of an access point. Additionally or alternatively, one or more of modules 102 in FIG. 1 may represent portions of a remote authentication server (e.g., a remote RADIUS server) that is remote from and accessible to an access point.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., access point 202, accessing device 206, and/or administering device 208), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include guest accounts 122 for storing information about one or more accounts used to secure access to a network and network policies 124 for storing information about one or more network policies used to manage access to the network. In at least one example, all or a portion of database 120 in FIG. 1 may represent portions of an embedded authentication server (e.g., an embedded RADIUS server) of an access point. Additionally or alternatively, all or a portion of database 120 in FIG. 1 may represent portions of a remote authentication server (e.g., a remote RADIUS server) that is remote from and accessible to an access point.

Database 120 may represent portions of a single database or computing device or a plurality of databases or computing devices. For example, database 120 may represent a portion of access point 202 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as access point 202 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include an access point 202 in communication with an accessing device 206 and an administering device 208 via a network 204. In one example, access point 202 may be programmed with one or more of modules 102 and/or may store all or a portion of the data in database 120. Additionally or alternatively, administering device 208 may be programmed with one or more of modules 102 and/or may store all or a portion of the data in database 120.

In one embodiment, one or more of modules 102 from FIG. 1 may, when executed by at least one processor of access point 202 and/or administering device 208, enable access point 202 and/or administering device 208 to provision access-point accounts on demand. For example, and as will be described in greater detail below, one or more of modules 102 may cause access point 202 and/or administering device 208 to receive, at access point 202, an authentication request 210 from an unknown guest to access network 204 via access point 202. In these examples, the unknown guest may not yet have an account with access point 202 that allows the unknown guest to access network 204 (e.g., account 220 may not yet exist), and authentication request 210 may include authentication information (e.g., username 212 and hash value 214) that was generated from at least one credential of the unknown guest (e.g., username 212 and/or password 218) that is required by access point 202 to provision account 220 for the unknown guest.

In some examples, one or more of modules 102 may further cause access point 202 and/or administering device 208 to (1) receive a provisioning request 216 that includes the credential (e.g., username 212 and/or password 218) from an administrator of network 204 to provision the account for the unknown guest using the credential, (2) provision, in response to receiving the second request, account 220 for the unknown guest using the credential received as part of provisioning request 216, and (3) enable the unknown guest to access network 204 using account 220.

Access point 202 generally represents any type or form of physical or virtual wireless access point that enables a computing device to wirelessly connect to a secured network. As shown in FIG. 2, access point 202 may enable accessing device 206 to wirelessly connect to network 204. In some embodiments, access point 202 may reside within a router, switch, or other network device. In other embodiments, access point 202 may represent a separate physical device.

Accessing device 206 and administering device 208 generally represent any type or form of computing device capable of reading computer-executable instructions. Examples of accessing device 206 and/or administering device 208 include, without limitation, smart phones, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between accessing device 206 and administering device 208.

Figure 3:
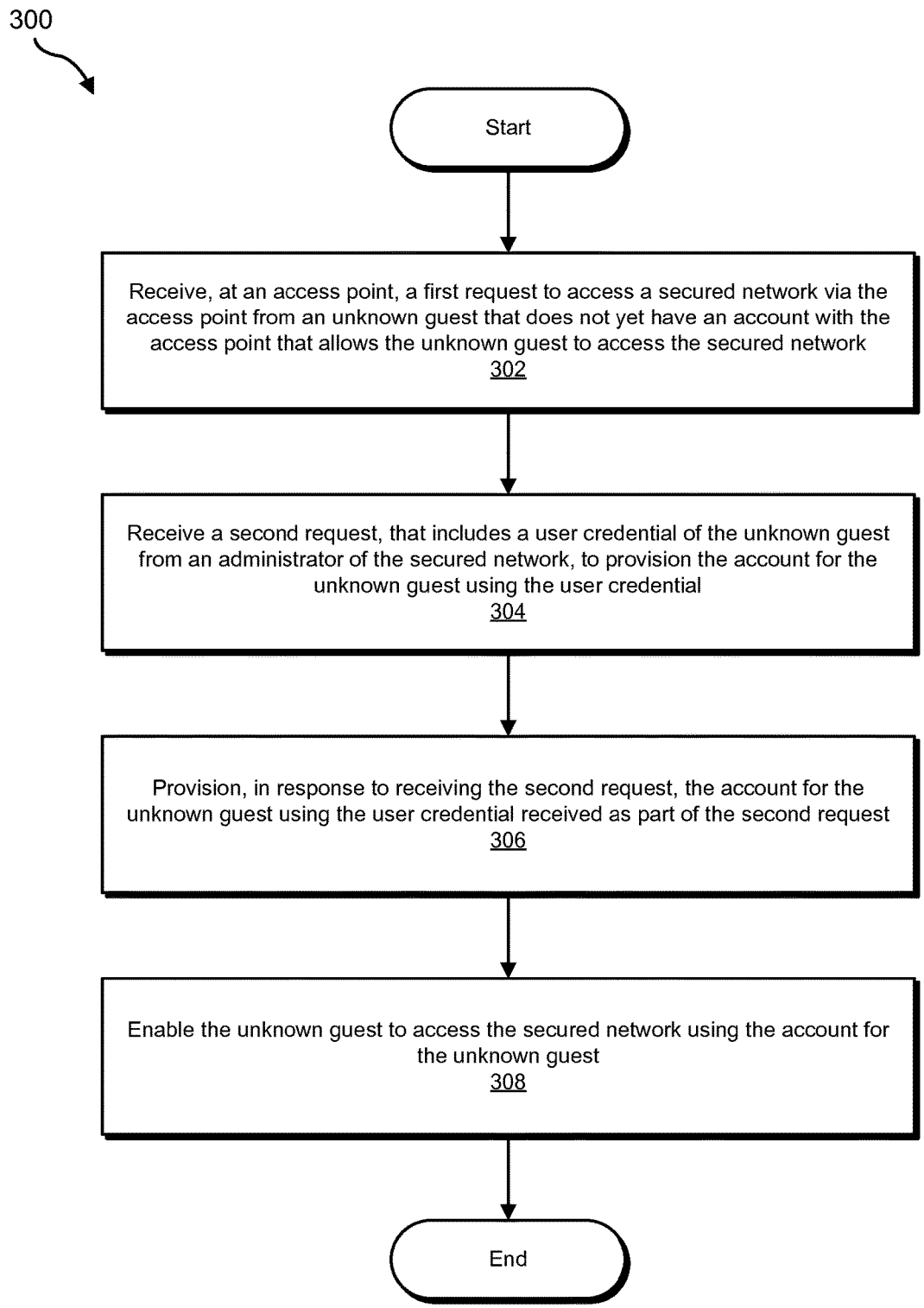
FIG. 3 is a flow diagram of an exemplary method for on-demand provisioning of access-point accounts.

FIG. 3 is a flow diagram of an exemplary computer-implemented method 300 for on-demand provisioning of access-point accounts. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may receive, at an access point, a first request from an unknown guest to access a secured network via the access point. For example, administering module 104 may, as part of access point 202 in FIG. 2, receive authentication request 210 from a user of accessing device 206 to access network 204 via access point 202.

The term "access point," as used herein, generally refers to any device and/or portion of executable code that enables a computing device to wirelessly connect to a secured network. In some examples, an access point may receive a request (e.g., a connection or authentication request) from a computing device to access the wireless access point and/or a network to which the wireless access point provides access. If the request can be authenticated, the access point may then facilitate the process of connecting the computing device to the network. As will be explained in greater detail below, if the request cannot be authenticated (e.g., the request comes from an unknown guest), the systems and methods disclosed herein may cause the access point to provision an account for the unknown guest with which the unknown guest may access the network.

In some examples, the systems and methods disclosed herein may use a security protocol for authentication and/or encryption that maintains separate accounts for each guest that is authorized to access a network secured by an access point. For example, the systems and methods disclosed herein may use WPA-ENTERPRISE for authentication and/or encryption, which may use RADIUS-based authentication using 802.1x. In some examples, the systems and methods disclosed herein may maintain separate accounts for each guest that is authorized to access the network secured by an access point using a remote or embedded authentication server (e.g., a remote or embedded RADIUS server).

Each account maintained by the systems and methods disclosed herein may include one or more credentials that may be used to authenticate requests to connect to an access point using the account. The systems and methods disclosed herein may use a variety of credentials to secure access to a network. As used herein, the term "credential" generally refers to any type or form of information or method used to control access to an access point and/or the networks that it secures. Examples of credentials that may be used by an access point to control access to a secured network may include, without limitation, knowledge-based credentials (e.g., something a guest knows), token-based credentials (e.g., something a guest has), biometric-based credentials (e.g., something a guest is), and/or any combination thereof. For example, a knowledge-based credential may include a username, a password, a personal identification number (PIN), and/or a passphrase, a token-based credential may include a one-time password and/or security code generated or received by a mobile and/or desktop computing device (e.g., a smart phone), and a biometric-based credential may include a fingerprint, a voiceprint, and/or an iris scan.

In some instances, if a guest has an account with a typical access point, the guest may initiate a request to connect to the access point using credentials associated with the account (e.g., a username and password). In some examples, a guest may initiate a request to connect to an access point by (1) selecting, via a computing device of the guest, the access point using a connection wizard on the computing device, (2) entering the guest's credentials into the connection wizard, and (3) initiating a connection request (e.g., a WPA-ENTERPRISE authentication request) via the connection wizard. In some examples, the connection wizard may then generate and transmit the connection request to the access point to begin the process of authenticating and connecting the computing device to the access point. Since the guest has an account with the access point, the access point may respond to the connection request with a successful authentication response so long as the guest enter the correct credentials.

In other instances, if a guest does not have an account with a typical access point, the access point would generally respond to any connection request from the guest with a failed authentication response and would not connect the guest's computing device to the network secured by the access point. However, as will be explained in greater detail below, by treating, at an access point, an unknown guest's request to connect to a network secured by the access point as an account-provisioning request, the systems and methods disclosed herein may (1) refrain from responding to the request with a failed authentication response, (2) enable an administrator of the network to authorize the account-provisioning request, (3) provision an account for the guest based on credentials entered by the unknown guest, (4) respond to the connection request with a successful authentication response after the account for the unknown guest is provisioned, and/or (5) connect the unknown guest's computing device to the network.

In some examples, by treating an unknown guest's request to connect to a network secured by an access point as an account-provisioning request, the systems and methods disclosed herein may enable an administrator of the network to provision an account for the unknown guest by telling the unknown guest to initiate a request to connect to the access point of the network with credentials of the unknown guest's choice. In this example, the unknown guest may (1) select, via a computing device of the unknown guest, the access point that provides access to the network, (2) choose credentials (e.g., a username and password) of the unknown guest's choice, (3) enter the credentials into a connection wizard on the computing device, and (4) initiate a connection request via the connection wizard. Using FIG. 4 as an example, user 402 may (1) select, via accessing device 206, access point 202 that provides access to network 204, (2) choose credentials (e.g., username 212 and password 218), (3) enter the credentials into a connection wizard on accessing device 206, and (4) initiate authentication request 210 via the connection wizard.

In general, an initial connection request or authentication request sent from a guest's computing device to an access point may include authentication information. As used herein, the term "authentication information" generally refers to any information that is generated using a credential of a guest that may be used to validate the credential of the guest. In one example, the term "authentication information" may refer to a hash value that is (1) generated from a password using a hash function and (2) used to validate the password. Using FIG. 4 as an example, hash value 214 may represent authentication information generated from password 218. The term "hash function," as used herein, generally refers to any one-way cryptographic function that, given a string of any length, produces a short, fixed-length value (typically a string of characters) called a "hash value." In another example, the term "authentication information" may refer to a one-time password that was generated by a device possessed by the guest that may be used to verify that the guest is in possession of the device. In some examples, an access point may need a credential to validate any authentication information generated using the credential. For example, an access point may need a password to validate a hash value generated using the password (e.g., by generating an additional hash value using the password and determining whether the hash value and the additional hash value match).

The systems described herein may receive a request from an unknown guest to access a secured network via an access point in any suitable manner. In some examples, authentication module 104 may receive a request from an unknown guest to access a secured network via an access point by receiving an initial connection request from the unknown guest to access the secured network via the access point. As used herein, the term "initial connection request" generally refers to any message transmitted from a device to an access point for the purpose of connecting the device to the access point. Additionally or alternatively, authentication module 104 may receive a request from an unknown guest to access a secured network via an access point by receiving an authentication request from the unknown guest. As used herein, the term "authentication request" generally refers to any message transmitted from a device to an access point for the purpose of authenticating a user of the device or the device itself. In at least one example, the term "authentication request" may refer to an authentication request of the Extensible Authentication Protocol (EAP).

In some examples, authentication module 104 may receive a request from an unknown guest to access a secured network via an access point by (1) receiving the request and (2) determining that the request was received from an unknown guest rather than a known guest. As used herein, the term "unknown guest" generally refers to any user that does not have an account with an access point. If authentication module 104 determines that a request was received from an unknown guest, authentication module 104 may consider the request to be a request from the unknown guest for a new account that includes the credentials entered by the guest as part of initiating the request. In some examples, authentication module 104 may refrain from responding to a request from an unknown guest with a failed authentication response and may, after an account for the unknown guest is provision, respond to the request with a successful authentication response.

In response to receiving a request from an unknown guest to access a secured network via an access point, authentication module 104 may (1) notify an administrator of the secured network of the request from the unknown guest and (2) enable the administrator to permit or deny the provisioning of a new account for the unknown guest. Moreover as indicated above, since a request from an unknown guest to access a secured network via an access point may include authentication information generated from a credential of the guest rather than the credential itself, authentication module 104 may additionally request the credential from the administrator. In these examples, the unknown guest may provide the credential to the administrator. In some examples, the systems and methods disclosed herein may transmit a notification of an unknown guest's request to access a secured network and/or a request for credentials of the unknown guest to an administrator of the secured network via a mobile provisioning application installed on a mobile device of the administrator.

Figure 4:
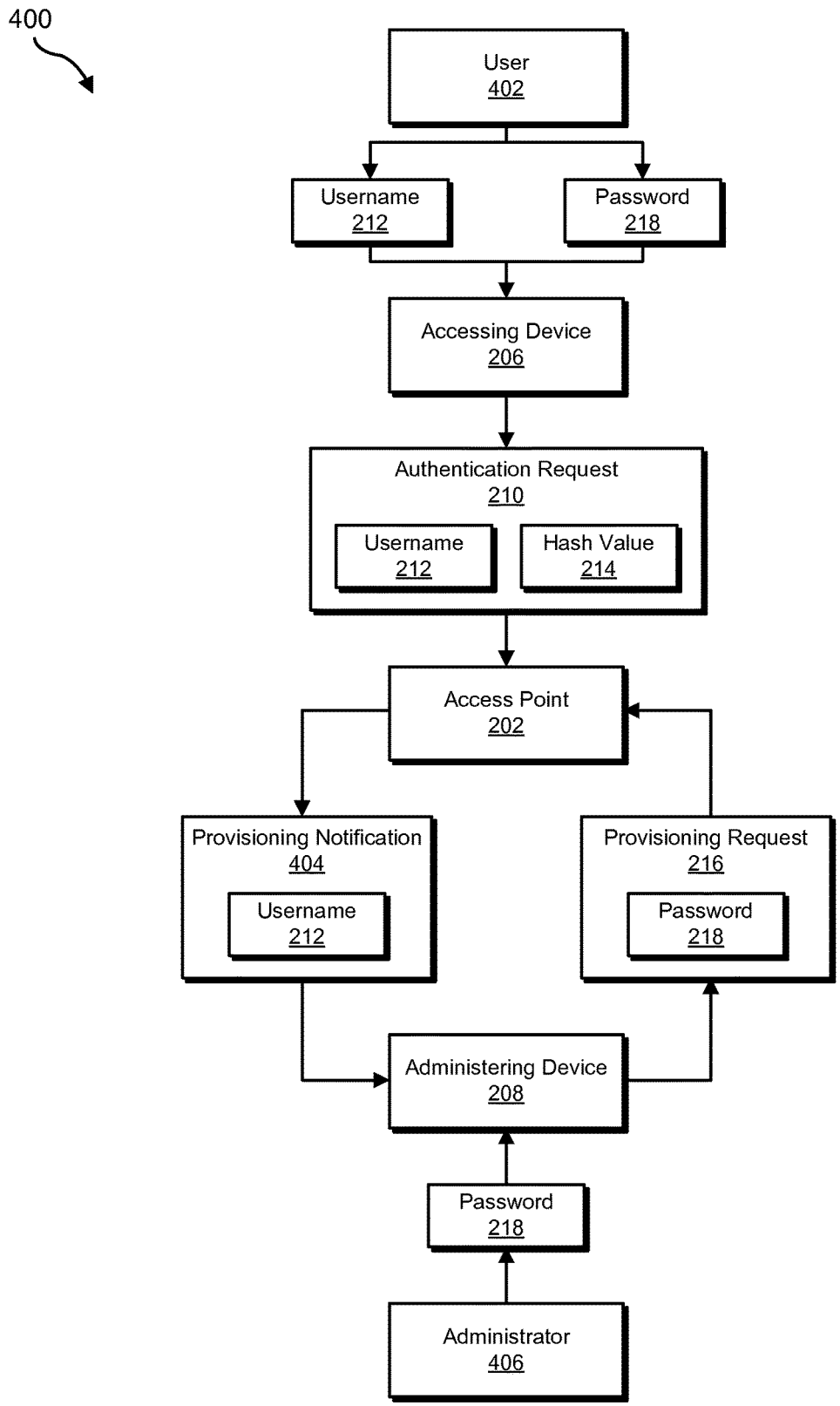
FIG. 4 is a flow diagram of an exemplary data flow for on-demand provisioning of access-point accounts.

Using FIG. 4 as an example, authentication module 104 may push, to administering device 208 of administrator 406 of network 204, provisioning notification 404 that may (1) notify administrator 406 of authentication request 210 from user 402 and (2) request password 218 (e.g., the password used to generate hash value 214 at accessing device 206). As shown, administrator 406 may enter password 218 into administering device 208, and administering module 112 may transmit password 218 to access point 202 as part of provisioning request 216, which may authorize the provisioning of an account for user 402.

At step 304, one or more of the systems described herein may receive a second request that includes the credential from an administrator of the secured network to provision the account for the unknown guest using the credential. For example, receiving module 106 may, as part of access point 202 in FIG. 2, receive provisioning request 216 from administrator 406 of network 204 to provision account 220 for user 402 of accessing device 206. In this example, provisioning request 216 may include password 218.

The systems described herein may receive a request to provision an account for an unknown guest in any suitable manner. In one example, an administrator of a network secured by an access point may use an account provisioning application installed on a device (e.g., a mobile device) of the administrator to authorize the provisioning of an account for the unknown guest and/or enter one or more credentials of the unknown guest that are needed to provision the account for the unknown guest. In this example, administering module 112 may, as part of the provisioning application, transmit a request to the access point for an account to be provisioned for the unknown guest using the credentials entered by the administrator, and receiving module 106 may receive the request to provision the account for the unknown guest from the provisioning application. In some examples, the administrator may also use the account provisioning application to select an account policy to apply to the account for the unknown guest. In this example, administering module 112 may, as part of the provisioning application, transmit a request to the access point for the account policy to be applied to the account for the unknown guest, and receiving module 106 may receive the request for the account policy to be applied to the account for the unknown guest.

At step 306, one or more of the systems described herein may provision, in response to receiving the second request, the account for the unknown guest using the credential received as part of the second request. For example, provisioning module 108 may, as part of access point 202 and/or administering device 208 in FIG. 2, provision account 220 for user 402 using username 212 and password 218 received as part of provisioning request 216.

The terms "access-point account" and "account," as used herein, generally refer to any identity of a guest maintained by an access point or authentication system that enables the access point or authentication system to authenticate the guest and/or provide the guest with access to a secured network. In general, an access-point account or account may (1) include one or more credentials that may be used for authentication and/or (2) include or be associated with one or more policies that govern a guest's access to a secured network.

The systems described herein may provision an account for an unknown guest in any suitable manner. In general, provisioning module 108 may provision an account for an unknown guest by creating an account that includes the credentials received as part of step 302 and 304. Using FIG. 4 as an example, provisioning module 108 may provision account 220 for user 402 by creating account 220 using username 212 received in authentication request 210 and password 218 received in provisioning request 216.

Before creating an account that includes the credentials received as part of step 302 and 304, provisioning module 108 may validate any credential received from an administrator using the authentication information received from the guest to ensure that the account is created using the correct credentials. Using FIG. 4 as an example, provisioning module 108 may validate password 218 received in provisioning request 216 using hash value 214 received in authentication request 210.

In some examples, the request received as part of step 304 may include information that indicates that an account policy should be applied to the account for the unknown guest. In these examples, provisioning module 108 may apply the account policy to the account for the unknown guest as part of creating the account for the unknown guest. As indicated above, after the account for the unknown guest is provisioned, authentication module 104 may respond to the request received at step 302 with a successful authentication response.

At step 308, one or more of the systems described herein may enable the unknown guest to access the secured network using the account for the unknown guest. For example, access-enabling module 110 may, as part of access point 202 in FIG. 2, enable user 402 of accessing device 206 to access network 204 using account 220.

The systems described herein may perform step 308 in any suitable manner. In general, access-enabling module 110 may enable a guest to access a secured network by connecting the computing device of the guest to the secured network and by enabling the computing device to send and receive data via the secured network according to any policies associated with the account of the guest. For example, access-enabling module 110 may enable user 402 to access network 204 by connecting accessing device 206 to network 204 according to policy 222. Upon completion of step 308, exemplary method 300 in FIG. 3 may terminate.

As explained above, by treating an unknown guest's initial Wi-Fi connection request that is received at an access point as an account-provisioning request, the systems and methods described herein may simplify the provisioning of an access-point account for the unknown guest. Furthermore, in some examples, by enabling an administrator of an access point that enables access to a secure network to (1) be notified via a mobile device of the administrator when guests wish access to the secured network and (2) provision, via the mobile device, accounts for the guests, these systems and methods may enable the administrator to easily provision guest accounts in a way that does not require the administrator to log into the access point to create an account for each guest that wishes to connect to the access point.

In some examples, the systems and methods disclosed herein may simplify the provisioning of access-point accounts (e.g., WPA-ENTERPRISE accounts) used to secure access to a Wi-Fi network by enabling an administrator of the Wi-Fi network to tell a guest to initiate a request to connect to an access point of the Wi-Fi network with credentials of the guest's choice. In this example, the guest may (1) select, via the computing device of the guest, the appropriate access point that provides access to the Wi-Fi network, (2) choose a username and password of the guest's choice, (3) enter the username and password into a connection wizard on the computing device, and (4) initiate a connection request (e.g., a WPA-ENTERPRISE authentication request) via the connection wizard.

Next, the access point may receive, from the computing device, the connection request from the guest. Instead of immediately rejecting the connection request as a result of the guest not yet having an account at the access point, the access point may hold off on responding to the connection request and may send a push notification to the administrator's mobile device. In response to receiving the push notification, a provisioning application on the mobile device may ask the administrator if the administrator wishes to permit the guest to join the Wi-Fi network. If the administrator wishes to allow access, the administrator may ask the guest for the password chosen earlier since it may not have been sent as part of the connection request and may enter this password into provisioning application on the mobile device, which may provision the account for the guest. Finally, the access point may resume the authentication handshake started earlier by the guest, and the guest may gain access to the Wi-Fi network. In some examples, the administrator may also select to apply account policies to the account as part of the mobile device provisioning workflow.

Figure 5:
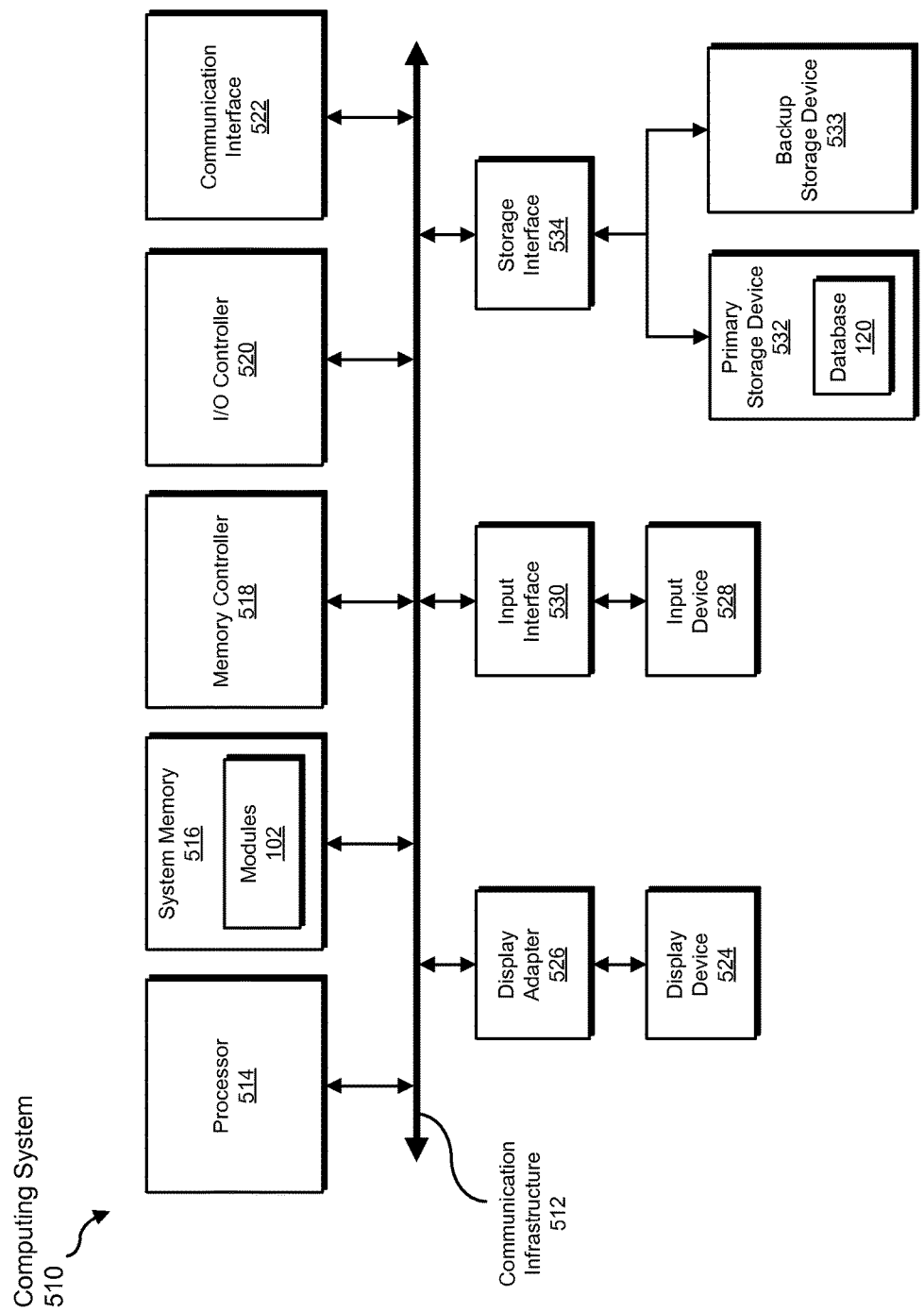
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
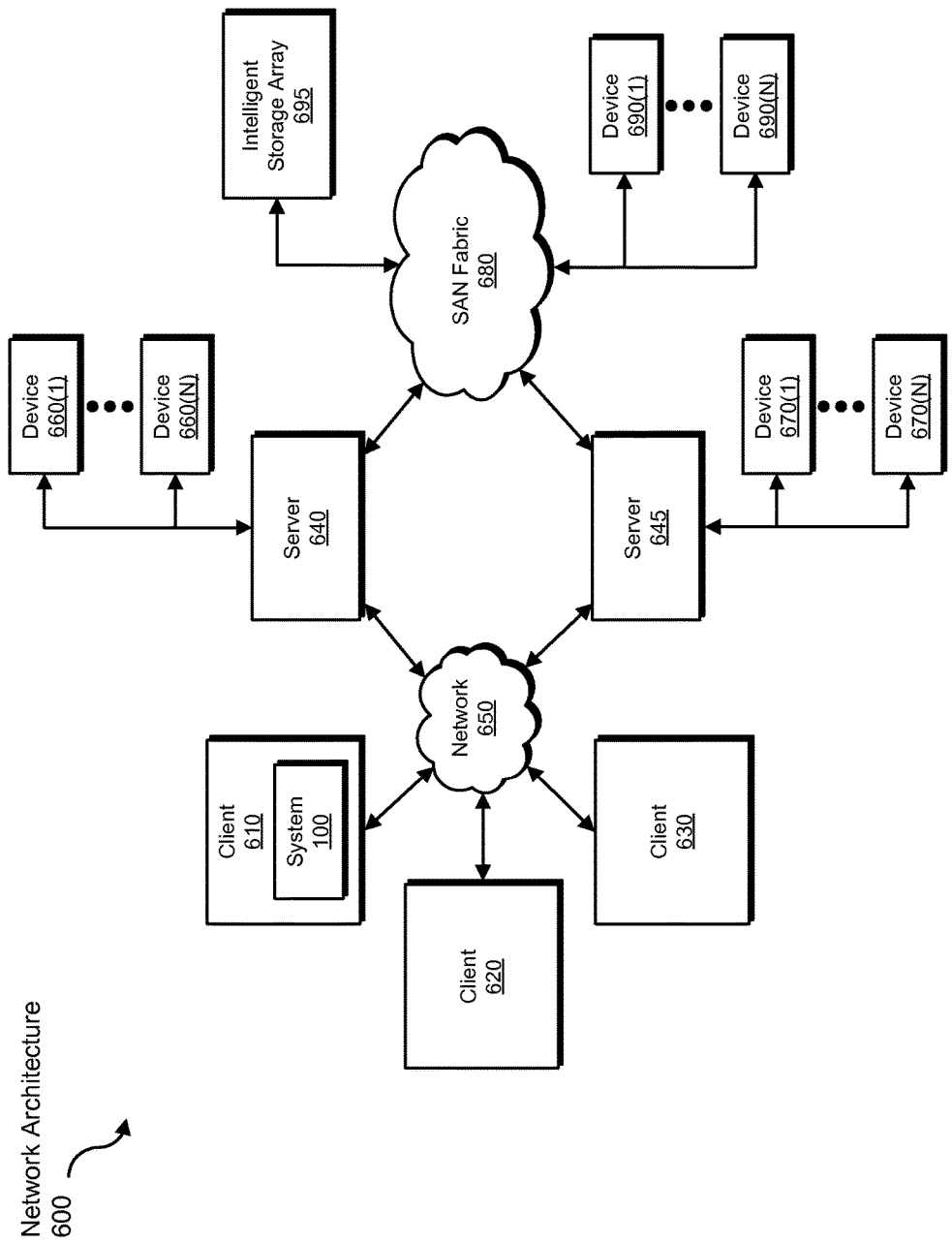
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for on-demand provisioning of access-point accounts.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive, at a wireless access point that enables computing devices to connect to a secured network, an initial connection request from an unknown guest that does not have an account with the wireless access point that allows the unknown guest to connect to the secured network, transform the initial connection request into an account for the unknown guest, output a result of the transformation to an remote or embedded authentication server, use the result of the transformation to enable the unknown guest to connect to the secured network, and store the result of the transformation to the remote or embedded authentication server. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for utilizing authentication requests for on-demand provisioning of access-point accounts, at least a portion of the method being performed by a wireless access point comprising at least one processor, the method comprising:

receiving, from an unknown device of an unknown user at the wireless access point before the unknown user has an account with the wireless access point that allows the unknown user to access a secured network via the wireless access point, an authentication request from the unknown user to authenticate and connect to the secured network via the wireless access point, wherein:

the authentication request is the same type of authentication request used to authenticate and connect known users to the secured network via the wireless access point and comprises authentication information that was generated at the unknown device of the unknown user from at least one unknown credential provided by the unknown user; and the unknown credential is of a type required by the wireless access point to authenticate known users; and treating the authentication request from the unknown user as an account-provisioning request by:

transmitting, in response to the authentication request from the unknown user, a credential request to an administrator of the secured network for the unknown credential of the unknown user and permission to provision the account for the unknown user;

receiving, from an administering device of the administrator after the credential request is transmitted to the administrator, a provisioning request from the administrator to provision the account for the unknown user using the unknown credential, wherein the provisioning request comprises the unknown credential;

provisioning, in response to receiving the provisioning request, the account for the unknown user using the unknown credential received as part of the provisioning request; and enabling the unknown user to access the secured network using the account for the unknown user.

2. The computer-implemented method of claim 1, wherein:

the unknown credential comprises a password;

the authentication information comprises a hash value that was generated at the unknown device of the unknown user and transmitted, from the unknown device, as part of the authentication request;

the computer-implemented method further comprises:

receiving, as input at the administering device of the administrator, the password from the administrator; and transmitting, from the administering device, the password as part of the provisioning request; and provisioning the account for the unknown user comprises provisioning the account for the unknown user using the password transmitted from the administering device.

3. The computer-implemented method of claim 2, wherein:

the administering device comprises a mobile device of the administrator;

the steps of receiving the password and transmitting the password are performed by a mobile application installed on the mobile device.

4. The computer-implemented method of claim 1, wherein the authentication request comprises an authentication request of an authentication protocol.

5. The computer-implemented method of claim 1, wherein the authentication request comprises an authentication request of an extensible authentication protocol.

6. The computer-implemented method of claim 1, further comprising:

refraining from responding to the authentication request with a failed authentication response;

responding to the authentication request with a successful authentication response after the account for the unknown user is provisioned.

7. The computer-implemented method of claim 1, wherein:

the provisioning request comprises information that indicates that an account policy should be applied to the account for the unknown user;

provisioning the account for the unknown user comprises applying the account policy to the account for the unknown user.

8. A system for utilizing authentication requests for on-demand provisioning of access-point accounts, the system comprising:

an authentication software engine, stored in memory, that:

receives, from an unknown device of an unknown user at a wireless access point before the unknown user has an account with the wireless access point that allows the unknown user to access a secured network via the wireless access point, an authentication request from the unknown user to authenticate and connect to the secured network via the wireless access point, wherein:

the authentication request is the same type of authentication request used to authenticate and connect known users to the secured network via the wireless access point and comprises authentication information that was generated at the unknown device of the unknown user from at least one unknown credential provided by the unknown user; and the unknown credential is of a type required by the wireless access point to authenticate known users; and treats the authentication request from the unknown user as an account-provisioning request by transmitting, in response to the authentication request from the unknown user, a credential request to an administrator of the secured network for the unknown credential of the unknown user and permission to provision the account for the unknown user;

a receiving software engine, stored in memory, that receives, from an administering device of the administrator after the credential request is transmitted to the administrator, a provisioning request from the administrator to provision the account for the unknown user using the unknown credential, wherein the provisioning request comprises the unknown credential;

a provisioning software engine, stored in memory, that provisions, in response to the provisioning request, the account for the unknown user using the unknown credential received as part of the provisioning request;

an access-enabling software engine, stored in memory, that enables the unknown user to access the secured network using the account for the unknown user; and at least one processor that executes the authentication software engine, the receiving software engine, the provisioning software engine, and the access-enabling software engine.

9. The system of claim 8, wherein:
the unknown credential comprises a password;
the authentication information comprises a hash value that was generated at the unknown device of the unknown user and transmitted, from the unknown device, as part of the authentication request;
the system further comprises an administering software engine that:
receives, as input at the administering device of the administrator, the password from the administrator; and
transmits, from the administering device, the password as part of the provisioning request;
the provisioning software engine provisions the account for the unknown user by provisioning the account for the unknown user using the password transmitted from the administering device.

10. The system of claim 9, wherein:
the administering device comprises a mobile device of the administrator;
the administering software engine comprises a mobile application installed on the mobile device.

11. The system of claim 8, wherein the authentication request comprises an authentication request of an authentication protocol.

12. The system of claim 8, wherein the authentication request comprises an authentication request of an extensible authentication protocol.

13. The system of claim 8, the authentication software engine further:
refrains from responding to the authentication request with a failed authentication response;
responds to the authentication request with a successful authentication response after the account for the unknown user is provisioned.

14. The system of claim 8, wherein:
the provisioning request comprises information that indicates that an account policy should be applied to the account for the unknown user;
the provisioning software engine provisions the account for the unknown user by applying the account policy to the account for the unknown user.

15. A non-transitory computer-readable medium comprising one or more computer-executable instructions that, when executed by at least one processor of a computing device, cause the computing device to:
receive, from an unknown device of an unknown user at a wireless access point before the unknown user has an account with the wireless access point that allows the unknown user to access a secured network via the wireless access point, an authentication request from the unknown user to authenticate and connect to the secured network via the wireless access point, wherein:
the authentication request is the same type of authentication request used to authenticate and connect known users to the secured network via the wireless access point and comprises authentication information that was generated at the unknown device of the unknown user from at least one unknown credential provided by the unknown user; and
the unknown credential is of a type required by the wireless access point to authenticate known users; and
treat the authentication request from the unknown user as an account-provisioning request by:
transmitting, in response to the authentication request from the unknown user, a credential request to an administrator of the secured network for the unknown credential of the unknown user and permission to provision the account for the unknown user;
receiving, from an administering device of the administrator after the credential request is transmitted to the administrator, a provisioning request from the administrator to provision the account for the unknown user using the unknown credential, wherein the provisioning request comprises the unknown credential;
provisioning, in response to receiving the provisioning request, the account for the unknown user using the unknown credential received as part of the provisioning request; and
enabling the unknown user to access the secured network using the account for the unknown user.

16. The non-transitory computer-readable medium of claim 15, wherein:
the unknown credential comprises a password;
the authentication information comprises a hash value that was generated at the unknown device of the unknown user and transmitted, from the unknown device, as part of the authentication request;
the one or more computer-readable instructions further cause the computing device to
receive, from the administering device of the administrator, the password as part of the provisioning request, wherein the password was received from the administrator as input at the administering device; and
the one or more computer-readable instructions cause the computing device to provision the account for the unknown user by causing the computing device to provision the account for the unknown user using the password transmitted from the administering device.

17. The non-transitory computer-readable medium of claim 16, wherein:
the administering device comprises a mobile device of the administrator;
the password was received from the administrator as input at the administering device via a mobile application installed on the mobile device.

18. The non-transitory computer-readable medium of claim 15, wherein the authentication request comprises an authentication request of an authentication protocol.

19. The non-transitory computer-readable medium of claim 15, wherein the authentication request comprises an authentication request of an extensible authentication protocol.

20. The non-transitory computer-readable medium of claim 15, wherein the one or more computer-readable instructions further cause the computing device to:
refrain from responding to the authentication request with a failed authentication response;
respond to the authentication request with a successful authentication response after the account for the unknown user is provisioned.

* * * * *